Figure 1:
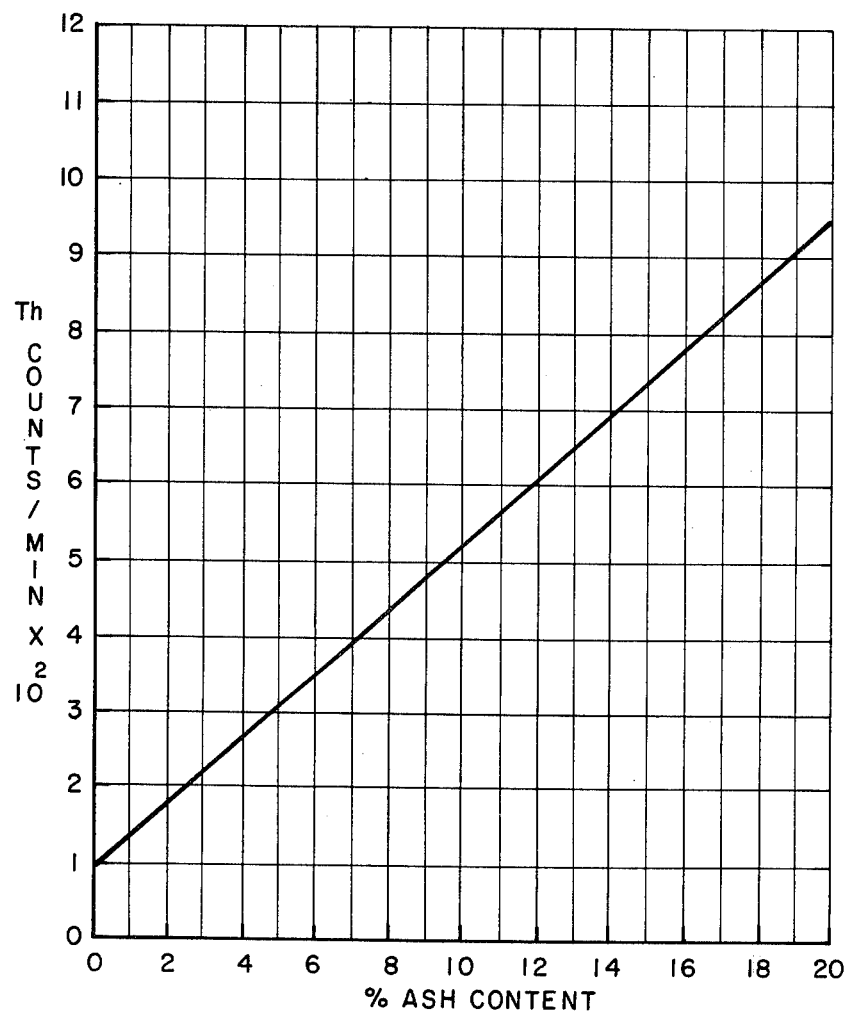

United States Patent [19]

Fertl et al.

[11] 4,118,623

[45] Oct. 3, 1978

[54] CONTINUOUS QUALITY CONTROL OF MINED HARD AND SOFT COALS

[75] Inventors: Walter H. Fertl, Houston, Tex.; Preston L. Gant, Ponca City, Okla.

[73] Assignee: Continental Oil Company, Ponca City, Okla.

[21] Appl. No.: 783,092

[22] Filed: Mar. 31, 1977

[51] Int. Cl.² .................... G01V 5/00; E21B 47/00
[52] U.S. Cl. ................................. 250/253; 175/41
[58] Field of Search ............... 250/253, 254, 255, 262; 175/41

[56] References Cited

U.S. PATENT DOCUMENTS 3,940,610  2/1976  Dennis et al. .................. 250/253

Primary Examiner—Alfred E. Smith
Assistant Examiner—Janice A. Howell
Attorney, Agent, or Firm—Cortlan R. Schupbach, Jr.

[57] ABSTRACT

A method is provided for determining the shale content of mined coal by monitoring the thorium content of the coal. Thorium content and ash content are shown to be related whereby a direct reading of the thorium will be indicative of the shale content of the coal and the ash content of the coal. The method utilizes the natural radiation of thorium to provide the continuous or selective control of mined coals.

7 Claims, 2 Drawing Figures

DISTRIBUTION OF THORIUM AND URANIUM IN SEDIMENTS

DISTRIBUTION OF THORIUM AND URANIUM IN SEDIMENTS

CONTINUOUS QUALITY CONTROL OF MINED HARD AND SOFT COALS

This invention relates to a method for determining the quality of mined coals. More particularly, this invention relates to a method for determining the quality of coals by using the natural radiation of thorium.

As liquid hydrocarbons have become less available and consequently more expensive, increasing attention has turned to solid hydrocarbons such as coal for energy supplies. As the demand for coal has increased, it has become necessary to increase production to meet this demand. Coal as mined is of many different qualities or ranks. Many methods are available for judging the quality of coal. Among them there are carbon and oxygen content, nitrogen content, moisture, volatile matter, ash, sulfer, etc. One of the most common quality checks is the ash content of coals as mined. This check is currently carried out according to a method similar to that found in ASTM D3174-73. Briefly, the method comprises weighing the residue remaining after burning the coal under rigidly controlled conditions of sample weight, temperature, time and atmosphere.

It is readily apparent that when determining the quality of large amounts of coal, that such a method, while valid, is cumbersome, slow and relies upon a limited number of samples to determine the quality of any particular coal. For example, to achieve a statistically significant sample of 10 tons of coal, many samples must be ashed using the procedure described in order to determine the quality of the coal. These methods, while they have served in the past, become less and less efficient as the amount of mined coal increases. In addition, these samples are normally taken after the coal has been removed from the mine and stockpiled, thus allowing for the possibility of surface samples reflecting only the later mined coal with the coal at the bottom of the stockpile going untested and perhaps falling outside of the quality limits determined by the tests.

It would therefore be of great benefit to provide an easy, efficient and accurate method for the determination of the ash content and hence the quality of mined coals. Such a method would ideally allow both spot and continuous checks and provide a valid relationship to the ash content of the coals.

It is therefore an object of the present invention to provide a method for determining the ash content of mined coal. Other objects will become apparent to those skilled in this art as the description proceeds.

It has now been discovered according to the present invention that when the shale content of a coal has been determined, the ash content can be directly correlated thereto. In the utilization of the instant invention the shale is determined using spectroanalysis techniques and utilizing the gamma ray emissions of thorium contained in the shale.

All coals contain shale to varying extents and all shales are naturally radioactive to some extent. It is well known that all shales contain both uranium and thorium. However, the amount of uranium in shale is no indication of the amount of shale since uranium can be transferred from place to place by water when in its oxidized state, whereas thorium is not water soluble and remains as originally laid down in the shale thus giving an accurate reading as to the shale present.

It has also been known that radioactivity can be used in mining for various purposes. For example, U.S. Pat. No. 3,019,338 relates to a method for controlling the position of a mining machine relative to clay and shale zones overlying and underlining coal deposits. The patent provides means such that the mining machine will irradiate the formation together with a detector for measuring radiation scattered by the formations together with suitable electronic apparatus for converting the output of the detector into a warning or signal for the operator when the machine is about to enter a hard zone.

U.S. Pat. No. 2,487,058 teaches that the natural radiation of subterranean formations can be monitored and that the gamma radiation monitored can be used to differentiate between different rock materials.

U.S. Pat. Nos. 2,897,368 and 3,105,149 show devices which separate the radioactive emissions from elements such as thorium, uranium, and potassium so that each is determined individually. These references relate to geophysical prospecting devices such as can be used from airplanes.

None of these references, however, provide a method for the quality control of mined coal as provided in the instant invention. Most references relate only to mining techniques or finding of large formations.

In carrying out the process of the instant invention, a calibration of the instrument measuring the radioactivity of thorium must be made. This calibration can be done by any means well known to those skilled in the art. However, for the purposes of this example, a sample of coal will be obtained and the ash content determined according to the method of ASTM D3174-73. The ash content will then be related to the thorium content of the sample and a correlation drawn therebetween. In addition, the amount of radioactivity found in the thorium sample will be simultaneously determined.

Since, as set forth above, thorium is essentially constant throughout shale deposits in any given deposit of coal, as opposed to uranium which can vary widely, once the background count of thorium in a particular deposit has been calibrated, and the relationship of thorium to ash in the deposit has been determined, a direct reading of background count will thereafter allow direct correlation to thorium and hence to ash.

FIG. 1 is a graph of thorium counts per minute versus percent ash content of coal. This relationship can be used to calibrate detecting apparatus for various ash levels. This relationship will be determined using the method set forth hereinafter.

Figure 2:
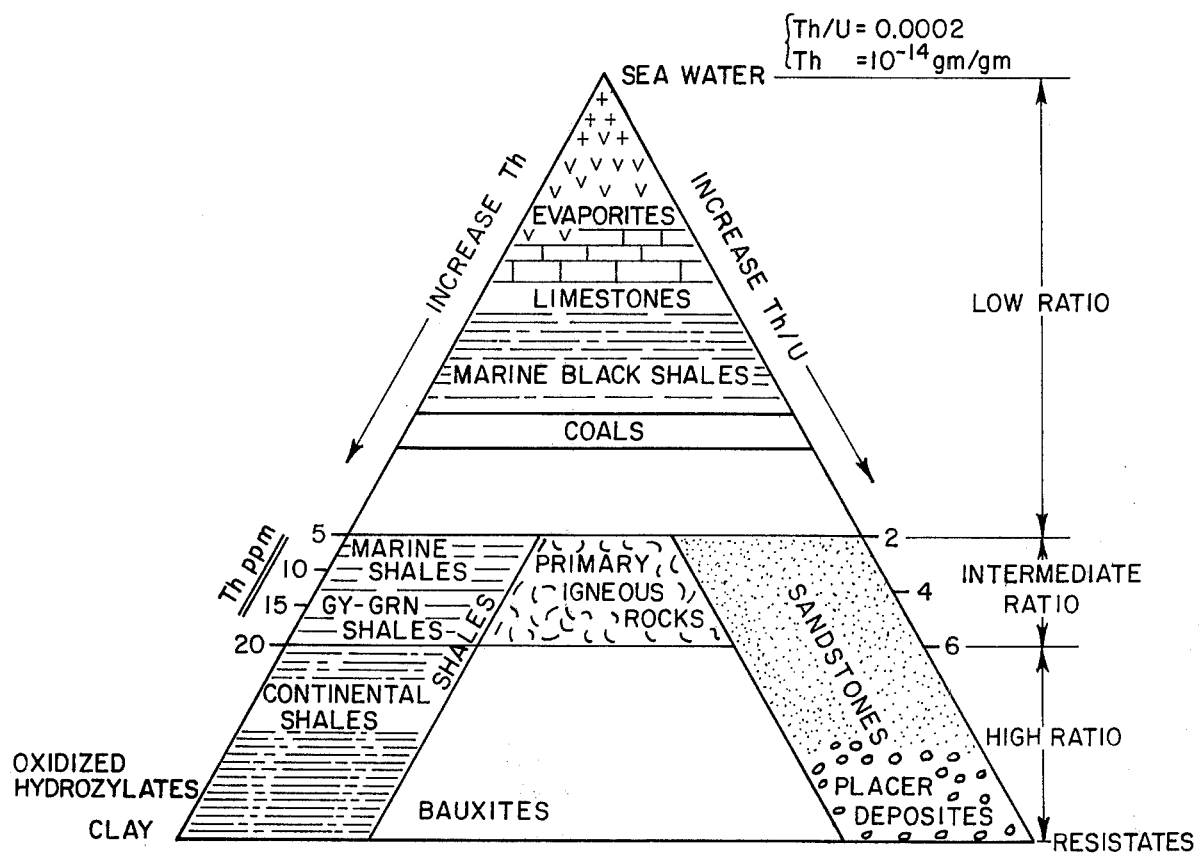

FIG. 2 shows the distribution of thorium and uranium in sediments and is included to show that thorium is present in coals and shales. The figure is reproduced from an article by Adams and Weaver in the *American Association of Petroleum Geologists*, volume 42, No. 2, page 429 (1967).

Calibration of the detection instrument can be easily accomplished by taking a statistically significant number of samples, usually from 25 to 50, of coal from the deposit with a known but variable ash content as determined by the ASTM method referenced above. The thorium content as counts per minute per unit weight are measured utilizing laboratory apparatus. A plot is then made comparing ash vs the thorium count based on the samples tested to determine the relationship which is essentially linear. Thereafter, using a large detector in the same configuration as to be used in the plant mine slurry line, belt conveyor, or wherever the detector is utilized, the thorium count can be determined on a few large samples of coal of varying ash content. During this calibration it should be insured that the large samples are measured in the first laboratory set as well. The large sample measurement will provide the working calibration curve, comparing thorium counts on an unknown sample and automatically setting forth the ash content. Referring to the calculated figure, it can be seen in FIG. 1 for example, that 900 thorium counts per minute would roughly correspond to an ash content of about 19 percent while a thorium count of about 200 per minute would indicate an ash content of about 2 percent. The actual numbers developed will be highly dependant on crystal size, crystal type, distance from the sample and other variables.

While the instant invention is applicable, of course, to coals already mined and in storage, it is believed that the primary use will be found during the mining operation itself. For example, in many modern operations, such as long wall mining, coal is removed on conveyor belts. A determination of ash quality of coal can be easily made simply by installing a radiation detector at an appropriate distance over the conveyer belt such that when the ash content changes, appropriate routing of the coal can be made. These checks can, of course, be made intermittently or continuously as desired. Should coal be removed by a slurry in pipelines, the instant method is applicable when the density of the coal in the slurry is taken into account. Should gondola cars or the like be used, again the background radiation will be effective in determining the ash content of the coals.

Usually the detector instrument will comprise a gamma ray spectrometer which uses an energy proportional detector in the sensing probe. Thorium has a 2.6 MEV gamma ray which is very penetrating and completely separable from potassium and uranium and is essentially unaffected by uranium radiation. Since the total thorium radiation is reasonably low compared to surrounding elements, longer counts can be used to increase the statistical accuracy of the system if necessary. In addition, tradeoffs can be made, such that by increasing the crystal size counting time can be reduced to the desired period. Usually such detectors will comprise sodium iodide or cesium iodide crystals which allow the detection of thorium radiation. Many such systems are well-known and are commercially available, among them a TN1705 analyzer, manufactured and sold by Tracor Northern Corporation. However any instrument which performs a similar function can of course be used.

By directly linking to the detecting instrument, variations of thorium count rate level can be used to shift coal from one area to another depending upon the amount of ash in a given amount of coal. It will be readily apparent that the present invention thus provides a simple, effective and inexpensive method for determining the ash content of mined coals. While in practice it will likely be necessary to recalibrate the detection instruments at intervals, such a method will greatly decrease the amount of laboratory determinations which are currently carried out. It will thus be apparent that a large advance in the art has been obtained in that much manual labor and uncertainty has been eliminated from the determination of ash content of coals.

While certain embodiments and details have been shown for the purpose of illustrating this invention, it will be apparent to those skilled in this art that various changes and modifications may be made herein without departing from the spirit or the scope of the invention.

We claim:

1. A method for the rapid determination of ash content of coal comprising a) determining the ratio of thorium to shale based on background gamma emissions; b) determining the ratio of shale to ash content using standard methods of ash determination; c) correlating (a) and (b) to provide a relationship of background gamma emission to ash content; and (d) thereafter determining ash content by means of surface gamma ray spectroanalysis of thorium content.

2. A method as described in claim 1 wherein said determination is made continuously.

3. A method as described in claim 2 wherein said determinations are made during the mining of coal.

4. A method as described in claim 3 wherein said determination is made at conveyer belts.

5. A method as described in claim 3 wherein said determination is made in pipelines.

6. A method as described in claim 3 wherein said determination is made in gondola cars.

7. A method as described in claim 4 wherein said surface gamma ray spectroanalysis is made by an energy proportional detector utilizing a cesium iodide or sodium iodide crystal.

* * * * *